United States Patent [19]

Herten et al.

[11] Patent Number: 4,540,736

[45] Date of Patent: Sep. 10, 1985

[54] TEMPORARY PROTECTIVE COATING COMPOSITION OF ETHYLENE AND ACRYLIC ACID AND A BASE

[75] Inventors: Joris F. A. Herten, Relegem; Emile M. Devroede, Buizingen, both of Belgium

[73] Assignee: Allied Corporation, Morris Township, Morris County, N.J.

[21] Appl. No.: 378,685

[22] Filed: May 17, 1982

[51] Int. Cl.$^3$ .............................................. C08L 33/02
[52] U.S. Cl. .................................................. 524/556
[58] Field of Search ................ 524/556, 559; 106/271

[56] References Cited

U.S. PATENT DOCUMENTS

| | | | |
|---|---|---|---|
| 3,392,131 | 7/1968 | Miles | 524/556 |
| 3,541,033 | 11/1970 | Buttrick | 524/559 |
| 3,658,741 | 4/1972 | Knutson | 524/556 |
| 3,677,989 | 7/1972 | Jenkinson | 524/556 |
| 4,173,669 | 11/1979 | Ashida | 524/556 |

*Primary Examiner*—Paul R. Michl
*Attorney, Agent, or Firm*—Richard A. Negin; Patrick L. Henry; Richard A. Anderson

[57] ABSTRACT

The aqueous, liquid composition, the method of preparation of the composition, and the method of use of the composition as a temporary coating. The composition comprises water, a copolymer of ethylene and an alpha,beta-ethylenically unsaturated carboxylic acid having a number average molecular weight of from about 500 to 5000 and an acid number of at least 100 milligrams of potassium hydroxide necessary to neutralize one gram of copolymer. There should be a sufficient amount of a base which is preferably volatile, to form a clear, aqueous liquid composition.

9 Claims, No Drawings

TEMPORARY PROTECTIVE COATING COMPOSITION OF ETHYLENE AND ACRYLIC ACID AND A BASE

BACKGROUND OF THE INVENTION

This invention is in the field of coating compositions; more particularly this invention relates to an aqueous composition of a copolymer of ethylene and an alpha,-beta-ethylenically unsaturated carboxylic acid, and a base which is preferably volatile, which is useful as a temporary protective coating.

Homogeneous copolymers of ethylene and unsaturated carboxylic acids, and their preparation are described in U.S. Pat. No. 3,658,741. This patent discloses low molecular weight ethylene carboxylic acid copolymers and the fact that they may be used to make aqueous emulsions which are stable and water clear in appearance.

SUMMARY OF THE INVENTION

The present invention is an aqueous composition of water and a copolymer of ethylene and an alpha,beta-ethylenically unsaturated carboxylic acid having at least one carboxylic group and 3–8 carbon atoms. The copolymer has a number average molecular weight of from 500 to 5,000 and an acid number of at least 100 milligrams of potassium hydroxide necessary to neutralize one gram of the copolymer. The preferred copolymer is the copolymer of ethylene and acrylic acid. There should be a sufficient amount of a base which is preferably volatile to form a clear aqueous liquid composition. The preferred base is ammonia. The aqueous composition of the present invention forms a transparent strippable film upon coating onto a substructure. The film is water resistant and can be washed off of the substructure with a mild basic solution.

The aqueous composition of the present invention can be produced by feeding the water, base and copolymer into a present vessel. The pressure vessel is sealed and heated to above 100° C., preferably above 105° C., for sufficient amount of time to form a clear liquid, preferably 5 to 15 minutes.

DESCRIPTION OF THE PREFERRED EMBODIMENTS

The present invention is an aqueous liquid composition, the method of preparation of the composition, and the method of use of the composition. The composition of the present invention comprises water, a sufficient amount of a base to form a clear liquid and from about 0.1 to about 20 percent by weight of a copolymer of ethylene and an alpha,beta-ethylenically unsaturated carboxylic acid having at least one carboxylic acid group and three to eight carbon atoms. The alpha,beta-ethylenically unsaturated carboxylic acid is preferably a monocarboxylic acid having three to six carbon atoms, including acrylic acid, methacrylic acid or crotonic acid.

The copolymer of ethylene and the alpha,beta-ethylenically unsaturated carboxylic acid has a number average molecular weight of from 500 to 5,000, and preferably 1,000 to 3,500. The number average molecular weight is measured by vapor pressure osmometry. The acid number of the copolymer is measured by the number of milligrams of potassium hydroxide necessary to neutralize one gram of the copolymer acid. Preferably, the acid number of the present invention is greater than 100, more preferably greater than 105 and most preferably greater than 115. A preferred acid number range is from 100 to 180 and more preferably 115 to 160. It has been found that copolymer acids with acid numbers below 105 do not form a uniform transparent film upon coating. The viscosity of the copolymer acid useful in the present invention is from about 0.5 to 10 pascal seconds (Pa.s) measured according to Brookfield viscosity at 140° C. The amount of the acid in the copolymer should be sufficient to maintain the above noted acid number ranges. There should be at least 10 mol percent, and preferably at least 15 mol percent of the acid in the copolymer. Preferably there is from 12 to 20 mol percent of the acid monomer in the copolymer.

The copolymer of ethylene and alpha,beta-ethylenically unsaturated carboxylic acid useful in the present invention are described and can be made in accordance with U.S. Pat. No. 3,658,741, incorporated by reference.

The aqueous, liquid composition of the present invention can have up to 20 percent by weight of the copolymer. Greater percentages are not desirable because of gel formation. Preferably there is from 0.1 to about 20 percent by weight of the copolymer in the composition with the preferred amount being from about 12 to about 18 percent by weight.

There is a sufficient amount of a base to form a clear, liquid composition of the water and copolymer. There is a sufficient base to result in the composition having a pH of greater than 7, preferably from about 7.5 to 11 and more preferably a pH of from 7.5 to 10. The base is preferably volatile so that it does not remain behind in the coating and affect the water resistance of the coating. Bases useful in the composition of the present invention include ammonia, morpholine, diethylaminoethanol, 2-amino-2-methyl-1-propanol, sodium hydroxide and potassium hydroxide. The preferred bases are volatile and include ammonia, morpholine, diethylaminoethanol and 2-amino-2-methyl-1-propanol. The most preferred base is ammonia. The preferred amount of base, preferably ammonia, is from 0.1 to 10 percent by weight, more preferably from 1 to 7 percent by weight.

The aqueous composition of the present invention is made by feeding water, a sufficient amount of a base, which is preferably volatile, and from 0.1 to 20 percent by weight of the above-described copolymer to a pressure vessel. The pressure vessel is sealed and heated to greater than 100° C. for sufficient time to form a clear liquid composition. Preferably, the pressure vessel is heated to from 100° C. to about 120° C., and more preferably from 105° C. to 120° C. It has been found that the pressure vessel should be treated for at least five minutes and preferably from 5 to 15 minutes to attain a satisfactory emulsion. The liquid composition so produced forms a transparent, coherent film when coated to a substrate or substructure.

The composition of the present invention forms a transparent film coating on a substructure which is water resistant and resistant to most road salts. At the same time the coating of the present invention can be stripped or removed from a substructure by the use of a mild basic solution which includes alkali and alkaline basic solutions, an alcohol, as well as a mild ammonia solution. The strippable coating is applied to a substructure by conventional coating means. Preferably, it can be sprayed on to the substructure to give a uniform and even surface. The substructure can be metal or lacquered surfaces. Preferred coating thicknesses are up to about 150 micrometers with 50 to 125 micrometers being preferred. This thickness of coating results in a coherent, transparent and glossy film upon drying. The drying takes at least 10 minutes and preferably about 20 minutes in a standard, nonventilated atmosphere. After this time the film will not be removed by a moderately violent water jet. This film provides rust protection to uncoated metallic surfaces as well as painted metal surfaces such as found on automobile body parts. It has been found that after three months of weathering (May, June, July 1980 in Belgium) the film is still easily removable by the application of a weak alkaline solution or an alcohol. The coating of the present invention can be used in rust proofing cars, machinery, etc. It is also useful for coating substrates, excluding articles such as cars while being transported between factory and dealer. It is useful on substructures such as walls or building materials to make them impermeable to water. Yet at the same time it is removable by the method discussed above.

Several examples are set forth below to illustrate the nature of the invention and the manner of carrying it out. However, the invention should not be considered as being limited to the details thereof.

EXAMPLE 1

A composition of the present invention was made with 40 parts of ethylene acrylic acid copolymers, which had an ASTM E-28 softening point of 92° C., a hardness according to ASTM D-5 of 11.5 dmm, a density according to ASTM D-1505 of 0.93 g/cc, a Brookfield Viscosity at 140° C. of 0.65 Pa.s, and about 15 mol percent acrylic acid with a correspondingly 85 mol percent ethylene. The composition contained 10 parts of a 28Bé (32%) ammonia solution and 200 parts of water.

These materials were put in a pressure vessel. The vessel was sealed and heated at 115° C. for 10-15 minutes. After cooling, a clear aqueous liquid resulted. This liquid thickened slightly after standing for one week, especially in a container which was not hermetically sealed. The original viscosity was restored by adding about 5 percent of distilled water to the thick liquid.

EXAMPLE 2

The composition of Example 1 was spread on steel plates (150 m × 100 m × 1 mm) first degreased with xylene. The steel type was 1145-32 according to Swedish Standards SIS141145 or British Standards BS1449 1B, CR3, GP. The coated thickness was 120 micrometers. The film was dried for 20 minutes by leaving it exposed to a standard lab atmosphere.

Plates were scratched with a nail and then exposed to weathering. After 2 months of weathering (March, April 1980 in Belgium) the plates showed no sign of rusting at the location where the emulsion was applied. The non-coated parts and the lines of the scratch were covered with rust. The rust did not penetrate beneath the film at the places which were not scratched. The film was still perfectly transparent and no white spots were observed.

EXAMPLE 3

A Volkswagen minibus 1980, blue color J5J5, was partially sprayed with a gun at 6 kg/cm² using a composition of the type made in Example 1. The aerosol was sprayed until the surface was just visibly but entirely wet. The VW was normally used during the months of May, June and July 1980 in Belgium, and was normally parked in the open air.

The sprayed portion of the car was very glossy and shiny and was smooth to the touch. The coated and uncoated parts were equally and regularly washed with soap and water. After 3 months the coating was still intact. The coated portion had a slight tendency to pick up dust.

In early August 1980 the coating was easily removed as follows: A solution was prepared of 2 percent potassium hydroxide and 2 percent of CMC (carboxymethylcellulose) in water. This thick solution was spread at a thickness of 0.5–1.0 mm on the coated surface. After 20 minutes in wind and sun, this solution was not dry. At this time a jet of water from a garden hose easily removed the complete coating and left the new car lacquer completely intact.

While exemplary embodiments of the invention have been described, the true scope of the invention is to be determined from the following claims:

What is claimed is:

1. A method comprising the steps of:
   coating a strippable coating composition onto a substructure, the coating composition comprising water, a sufficient amount of a base to form a clear aqueous liquid composition, and from 0.1% to 20% by weight of a copolymer of ethylene and an emulsifiable alpha,beta-ethylenically unsaturated carboxylic acid having at least one carboxylic group and 3 to 8 carbon atoms, the copolymer having a number average molecular weight of from 500 to 5,000 and an acid number of at least 100 milligrams of potassium hydroxide necessary to neutralize one gram of the copolymer; and
   washing the coating composition off of the substructure with a basic solution.

2. The method as recited in claim 1 further comprising drying the composition in the substructure after coating.

3. The method as recited in claim 1 wherein the base is selected from the group consisting of ammonia, morpholine, diethylaminoethhanol, 2-amino-2-methyl-1-propanol, sodium hydroxide and potassium hydroxide.

4. The method as recited in claim 1 wherein the base is volatile.

5. The method as recited in claim 4 wherein the base is selected from the group consisting of ammonia, morpholine, methylaminoethanol, and 2-amino-2-methyl-1-propanol.

6. The method as recited in claim 1 wherein there is from 0.1 to 20% by weight ammonia.

7. The method as recited in claim 6 wherein there is from 1 to 7 percent by weight of ammonia.

8. The method as recited in claim 1 wherein the copolymer has an acid number of from 115 to 160.

9. The method as recited in claim 1 wherein the basic solution is selected from the group consisting of alkali basic solutions, alkaline basic solutions, alcohol and ammonia.

* * * * *